United States Patent [19]

Ross et al.

[11] 3,911,829
[45] Oct. 14, 1975

[54] WHEELED VEHICLE MAGNETIC SUSPENSION SYSTEM

[75] Inventors: James A. Ross, La Jolla; James A. Houdyshel, San Diego, both of Calif.

[73] Assignee: Rohr Industries, Inc., Chula Vista, Calif.

[22] Filed: Sept. 25, 1974

[21] Appl. No.: 509,012

[52] U.S. Cl.... 105/157 R; 104/23 FS; 104/148 MS; 267/182
[51] Int. Cl.² ......................................... B61F 05/00
[58] Field of Search .......... 105/157 R; 104/148 MS, 104/23 FS; 308/10; 267/182; 280/106.5 R

[56] References Cited
UNITED STATES PATENTS

| | | | |
|---|---|---|---|
| 408,465 | 8/1889 | Dewey | 104/148 MS |
| 2,743,956 | 5/1956 | Birkenstein, Jr. | 104/148 MS |
| 3,842,753 | 10/1974 | Theodore et al. | 105/157 R |
| 3,849,724 | 11/1974 | Ghibu et al. | 104/148 MS |

Primary Examiner—John J. Love
Attorney, Agent, or Firm—Patrick J. Schlesinger; Frank D. Gilliam

[57] ABSTRACT

An improved combination electromagnetic suspension, dampening, lateral stability and axial separation system for a surface supported transportation vehicle having a sprung load carrying portion and an unsprung surface contacting portion with a controllable air gap therebetween. The apparatus of the system comprises separate controllable transverse electromagnets having a concave profile cooperating with a convex superposed ferromagnetic member for suspension. Additionally, the ferromagnetic member has separate controllable electromagnets cooperating with the suspension magnets for lateral stability. Additional separately controllable electromagnets and cooperating ferromagnetic members are provided to prevent axial instability between the sprung and unsprung vehicle portions during acceleration and deceleration. The control circuits provide non-linear feedback so as to substantially maintain a preselected gap distance between the various electromagnets and their associated ferromagnetic member.

42 Claims, 11 Drawing Figures

WHEELED VEHICLE MAGNETIC SUSPENSION SYSTEM

BACKGROUND OF THE INVENTION

This invention pertains to an improved suspension and dampening system to provide a smooth course, soft ride characteristics for vehicles used in moving passenger and freight along the supporting surface and more specifically to a trackway supported and guided vehicle traveling at speeds upwards from 80 mph. The various prior art vehicles having sprung and unsprung portions have a common disadvantage, namely, mechanical interconnections that transfer vibrations from the unsprung to the sprung portion and that must periodically be replaced due to wear. The first significant improvement for suspending and dampening of surface supported vehicles was disclosed in copending application Ser. No. 251,118, by co-inventors James A. Ross, inventor of the instant invention, and Bert C. Harris and assigned to the assignee of the instant invention, Rohr Industries, Inc. This prior application teaches the concept of employing magnetic flux for suspension and vertical dampening of surface supported vehicles. Using magnetic flux in this manner there is provided a non-contact support between the sprung and unsprung vehicle portions. Although this concept is very effective in resolving some of the age old problems preventing high speed capabilities from conventional wheel/rail vehicles, there are certain drawbacks. Banking would be limited by the narrow gap distance between the sprung and unsprung portions and axle stability between the sprung and unsprung portions is maintained by mechanical interconnections that have physical contact when the vehicle is either an accelerating or decelerating mode. If the gap was increased to provide the degree of banking normally required, excessive power must be used in the suspension of the vehicle. It would obviously be advantageous to provide a suspension and vertical dampening system for a wheel/rail vehicle that included vehicle banking capabilities through a wide arc of lateral movement while maintaining a relatively small air gap distance between the sprung and unsprung portions of the vehicle so as to economize suspension power and to eliminate physical contact between the sprung and unsprung portions when accelerating and decelerating to prevent the transfer of unsprung vibrations to the sprung portion. The problems were not satisfactorily resolved until emergence of the instant invention.

SUMMARY OF THE INVENTION

In accordance with the present invention there is provided an improved apparatus for suspension and vertical dampening of a surface supported vehicle resulting in improved ride characteristics of the sprung portion of a high speed surface supported vehicle while maintaining a predetermined air gap spacing from the unsprung portion.

The invention further provides axial control between the sprung and unsprung portions to prevent physical contact therebetween during either acceleration or deceleration of the vehicle.

The invention still further provides relative transverse rotational movement between the sprung and unsprung portions of the vehicle while maintaining the selected air gap spacing therebetween and the sprung portion in a plumb position while banking the unsprung portion.

The foregoing and other features of the invention will become more fully apparent from the following detailed description with reference to the accompanying drawings.

DETAILED DESCRIPTION OF THE PREFERRED EMBODIMENTS OF THE INVENTION

Figure 1:
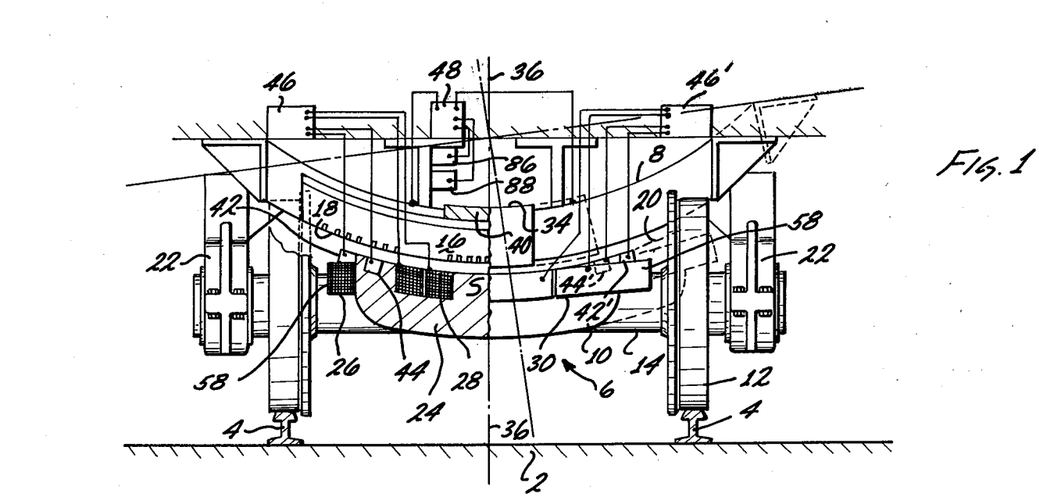
FIG. 1 is an end view of a fragmentary portion of a conventional railway truck employing the instant invention.
Figure 2:
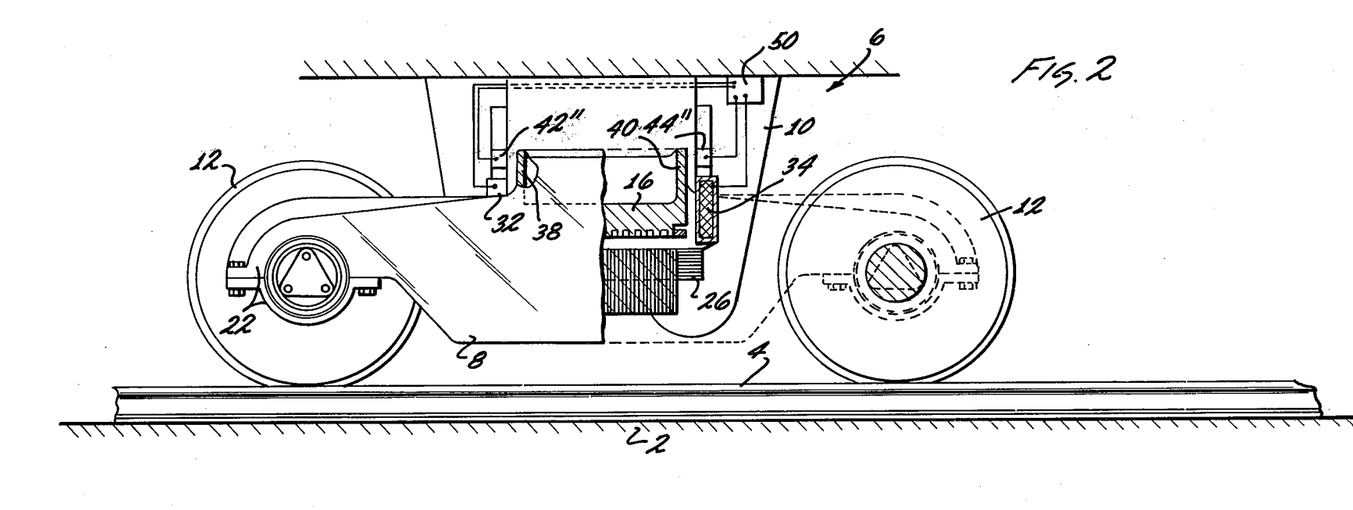
FIG. 2 is a partial cutaway side view of the railway truck of FIG. 1.

The application of the invention is hereinafter described as applied to a well-known conventional surface supported flanged wheel-rail vehicle system as shown by FIGS. 1 and 2, commonly in use throughout the world. The invention is, of course, not limited to this use and would be equally advantageous when applied to any vehicle system having various different types of support means, such as air cushions, air bearings, magnetic means, rubber tire wheel systems and any other means that is surface or overhead supported.

Referring now to FIGS. 1 and 2, the support surface 2 supports a pair of spaced apart juxtaposed conventional steel vehicle support and guide rails 4. The vehicle truck 6 includes unsprung 8 and sprung 10 portions. The unsprung portion comprises flanged support wheels 12 interconnected by a transverse axle 14 and a ferromagnetic member 16. The ferromagnetic member includes a pair of side-by-side electromagnetic coils 18 and 20 (not shown in detail) embedded therein wound in opposite directions and hereafter described in detail. The ferromagnetic member 16 has a convex downwardmost profile and is fixedly supported on each extremity by an axle hub bearing 22. The sprung portion 10 comprises a support magnet 24 having a concave upper profile superposed by the ferromagnetic member 16 and includes three side-by-side separate electric magnetic coils 26, 28, and 30 (not shown in detail) transversely spaced apart and embedded within the core of support magnetic member 24. These coils 26, 28, and 30 provide for attractive magnetic suspension of the sprung portion 10 at a preselected gap spacing from the unsprung portion 8. The sprung portion 10 additionally carries a pair of vertical positioned axial electromagnets 32 and 34 located on each longitudinal side of the center 36 of the truck 6. These axial magnets cooperate with a pair of ferromagnetic members 38 and 40 positioned therebetween in an opposing relationship and carried by the unsprung portion 8. The sprung portion 10 additionally carries a plurality of accelerometer sensors 42, displacement sensors 44, and control circuits 46, 48, and 50 hereinafter explained in more detail. The lateral stability coils 18 and 20 of the ferromagnetic member 16 are positioned in a spaced apart relationship across the member in a transverse manner so that the two coils substantially superpose the three coils 26, 28, and 30 of the suspension electromagnet 24. The windings of the coils 18 and 20 respectively are closely spaced apart at the center of the truck so as to provide a single slot within the ferromagnetic member 16 for two stacked turns of the winding. The portion of the same coils 18 and 20 remote from the center of the truck are provided with similar slots except that they are spaced apart a greater distance than at their center portion, the slots are somewhat shallower so as to provide a space for a single turn of the winding rather than two stacked. This feature and the fact that the windings 18 and 20 are wound in opposite directions provide for a greater flux concentration toward the center longitudinal axis of the vehicle.

Figure 3:
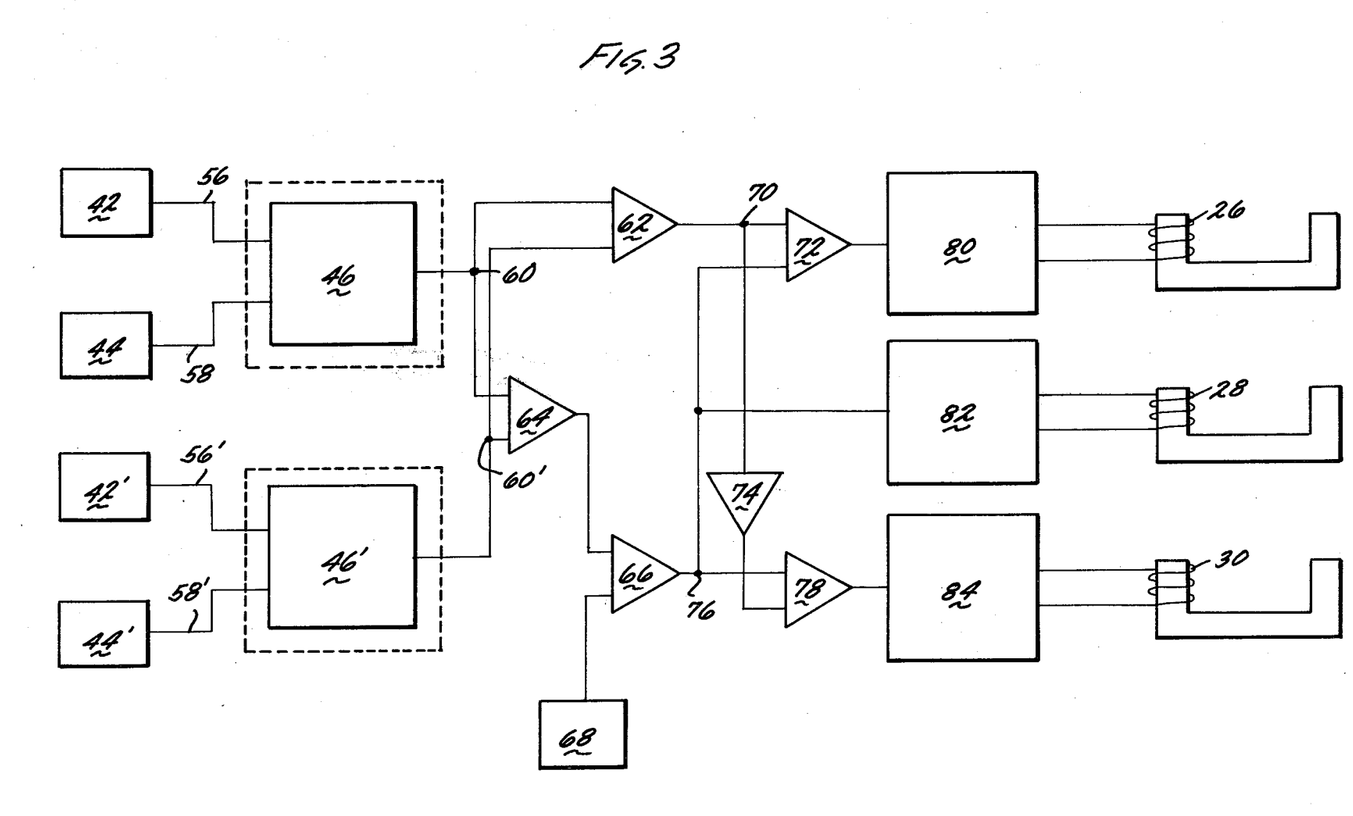
FIG. 3 is a block showing of the electronic circuit of the suspension controls.

Referring now to FIG. 3, each truck 6 of the vehicle has a fore and aft suspension electromagnet 24 and their associated control system 46. These control systems are comprised of the following components interconnected as shown by the FIG. 3 block diagram and operate so as to maintain a substantially constant gap distance between the support magnets 24 and its associated ferromagnetic member 16, while providing soft ride characteristics to the sprung portion. Each control circuit 46 comprises two pairs of sensors. Each sensor pair includes an accelerometer 42 and a displacement sensor 44. The accelerometer 42 monitors any acceleration associated with vertical movement of the sprung portion with respect to an imaginary reference point fixed in free space and supplies an electrical signal 56 corresponding thereto. The displacement sensor 44 monitors a change of gap space length $l$ from a preselected length between the suspension magnet 24 and the ferromagnetic member 16 and supplies an electrical signal 58 to the control circuit corresponding thereto. Each pair of sensors is positioned at each transverse extremity 58 of their respective suspension electric magnet.

The electrical signals 56 and 58 from the sensors supply separate inputs to their associated non-linear feedback circuit 46, hereinafter described in detail, so as to produce a single combined non-linear output signal 60 representative of the correction current required in the suspension magnet coils to maintain the preselected gap length and smooth ride qualities of the sprung portion.

The output signals 60 from the feedback control 46 take two parallel paths. The first path from feedback control 46 is fed into a first input of differential amplifier 62 of a type MC1741 manufactured by Motorola or its equivalent. The second path from feedback control 46 is fed into a first input to a summing amplifier 64 of a type MC1741 manufactured by Motorola or its equivalent operating as a summing amplifier. The first path from feedback control 46' supplies the second input of differential amplifier 62. The second output from feedback control 46' is fed into the second input of summing amplifier 64. The output of the summing amplifier 64 supplies one of two inputs to a differential amplifier 66 of the same type MC1741 or its equivalent operating as an error detector. The second input to differential amplifier 66 is supplied by a d.c. reference voltage source 68 having an adjustable output in a range of 0 to 15 volts.

The output 70 from differential amplifier 62 divides into three parallel paths. One path supplies a first input to summing amplifier 72 of the same type MC1741 or its equivalent. A second path supplies an input to an inverting operational amplifier 74 of a type well known in the electronic art having a 1 to 1 amplification factor and with an output signal of opposite polarity from its input signal.

The output from differential amplifier 66 also takes two parallel paths. A first path supplies a second input to summing amplifier 72 while the second path supplies a first input to differential amplifier 78 of the same type MC1741 or its equivalent.

The outputs from summing amplifier 72, the third output from differential amplifier 62 and the output from summing amplifier 78 supply control voltage signals to their associated power amplifiers 80, 82 and 84 respectively. The outputs from these power amplifiers supply current to their associated magnetic coils 26, 28 and 30 for controlling the spaced apart suspension between the sprung and unsprung portions of the vehicle.

Figure 4:
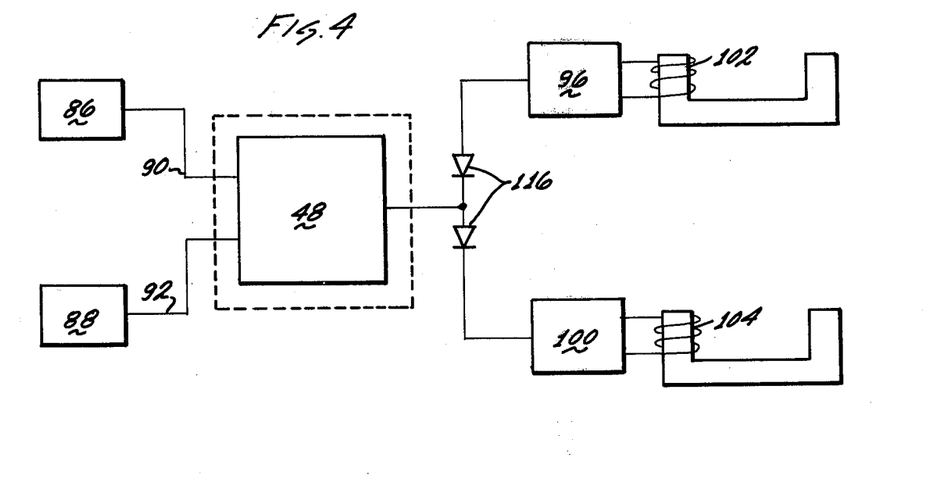
FIG. 4 is a block showing of the electronic circuit of the lateral stability and banking control.

Referring now to FIG. 4, this figure is a block presentation of the control circuit for the two lateral stability coils 18 and 20 embedded in the ferromagnetic member 16 for co-acting with the suspension magnet coils 26, 28 and 30. These coils 18 and 20 maintain lateral stability between the sprung and unsprung portion on level travel and provide relative movement between the sprung and unsprung portions when banking of the unsprung portion is required or exists so as to maintain the sprung portion in a plumb condition. The control circuit consists of an inclinometer sensor 86 of the type LSO manufactured by Schaevitz Engineering or its equivalent for monitoring the plumb condition of the sprung portion of the vehicle and a displacement transducer 88 of the same type as 44 for measuring changes in distance between sprung and unsprung portions of the vehicle. These sensors produce a signal voltage corresponding to the acceleration of the displacement distance of out of plumb condition of the sprung portion. The output signals 90 and 92 respectively from these sensors are fed into the feedback control circuit 48 of FIGS. 8 and 9. These circuits shown are a portion of the same circuit shown in block in FIGS. 3, 6 and 7, the latter two hereinafter discussed in more specific detail. The output signal from the feedback control follows two parallel paths. The first path provides an input signal to power amplifier 96 through diode 116 for controlling its output current and the other path through a second diode 116 having a polarity reversed from the other diode provides an input signal to amplifier 100. The output currents from power amplifiers 96 and 100 supply controlled current through coils 102 and 104 respectively for maintaining lateral stability between the sprung and unsprung portions while maintaining the sprung portion in substantially a plumb condition without respect to the position of the unsprung portion.

Figure 5:
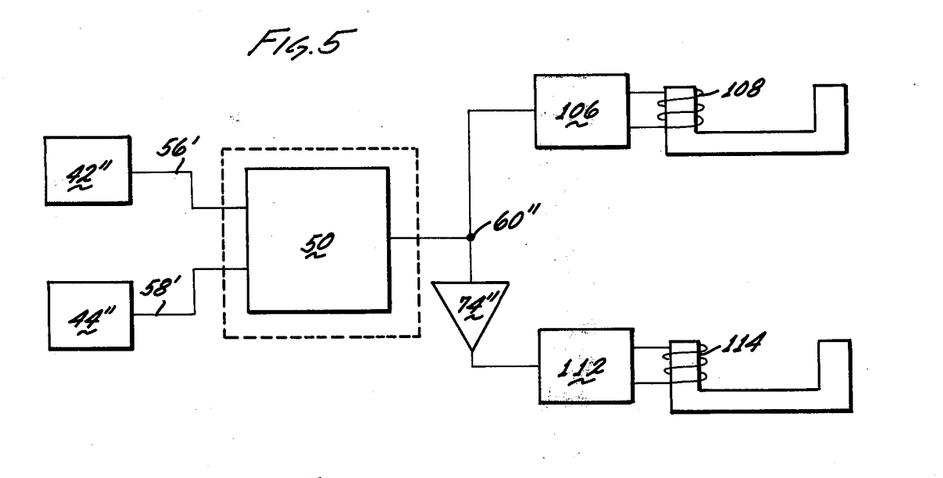
FIG. 5 is a block showing of the electronic circuit of the axial stability control.

Referring now to FIG. 5, this figure is a block showing of the control system for the axial stability magnets 32 and 34. An accelerometer sensor 42″ monitors any axial movement of the sprung portion with respect to fixed position in free space while the displacement sensor 44″ monitors any axial change in gap spacing between either one of the coils 32 or 34 and its cooperating ferromagnetic member carried by the unsprung portion. The sensors are of the same type hereinbefore described and shown in FIGS. 3, 4 and 7. The sensor output 56′ and 58′ are fed into the inputs of the feedback control 50, as hereinbefore described in general terms and hereinafter described in specific detail. The output signal 60″ from the feedback control follows two parallel paths. One path supplies an input to power amplifier 106 which in turn supplies controlled current to winding 108 of the axial stability magnet 32. The other path supplies an input to inverting amplifier 110, the same type as hereinbefore described. The output from the inverting amplifier 74″ supplies an input to power amplifier 112 which controls the current through winding 114 of axial stability magnet 34.

As hereinbefore noted, the similar components of all the feedback controls of the various figures are identical. Preferably, the feedback circuit employed either in full or in part is the feedback circuit fully described in U.S. Pat. No. 3,638,093 by James A. Ross, inventor of the instant invention. However, the feedback circuit from U.S. Pat. No. 3,736,880 by the same inventor can with slight modification be adapted for use in the instant invention. There are also various other feedback control systems that could be modified and adapted to perform the instant invention satisfactorily.

Figure 6:
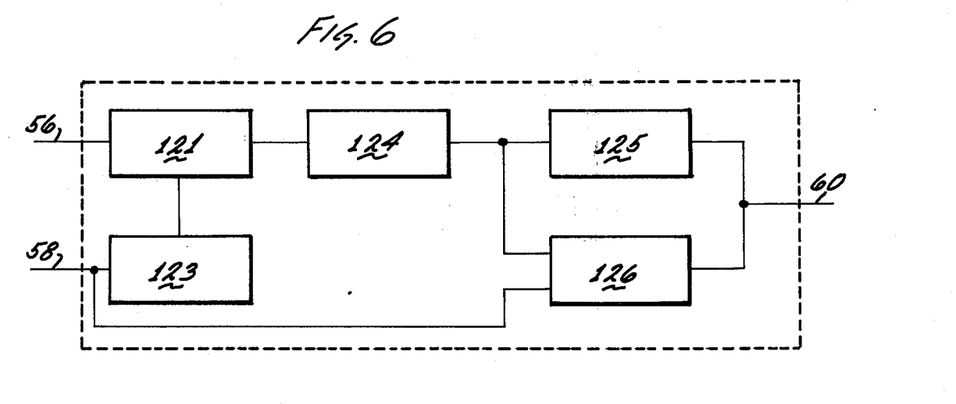
FIG. 6 is a block showing of the electronic circuit of the feedback control of FIGS. 3, 4 and 5.
Figure 7:
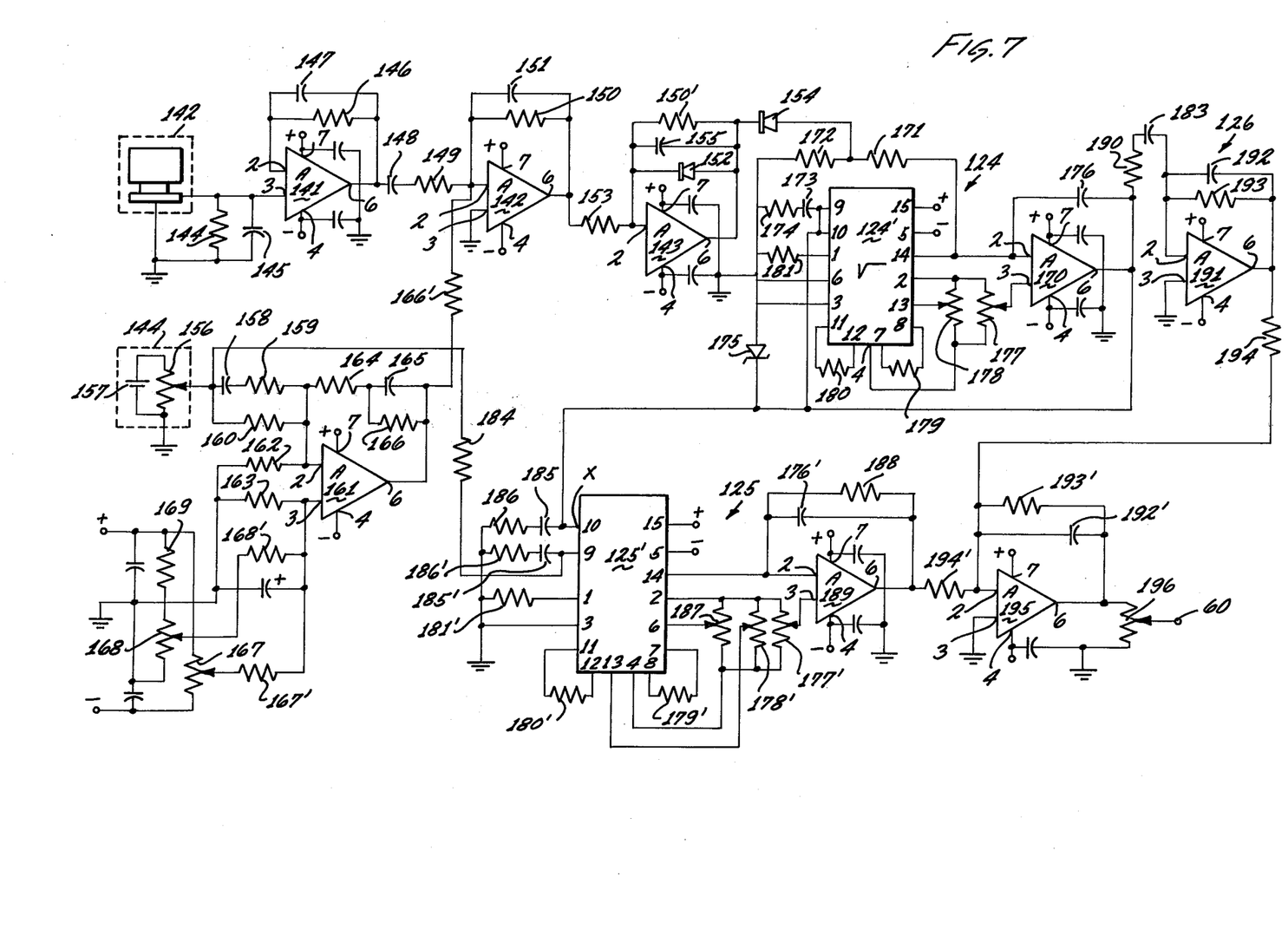
FIG. 7 is the schematic diagram of the electronic feedback control circuit of FIG. 6.
Figure 8:
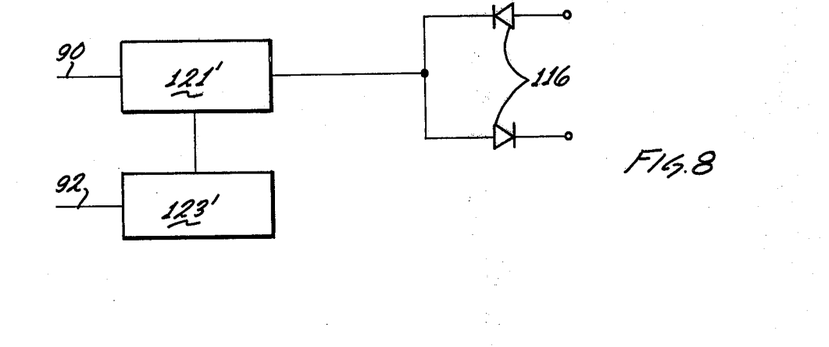
FIG. 8 is a block showing of the electronic feedback control circuit of FIG. 4.
Figure 9:
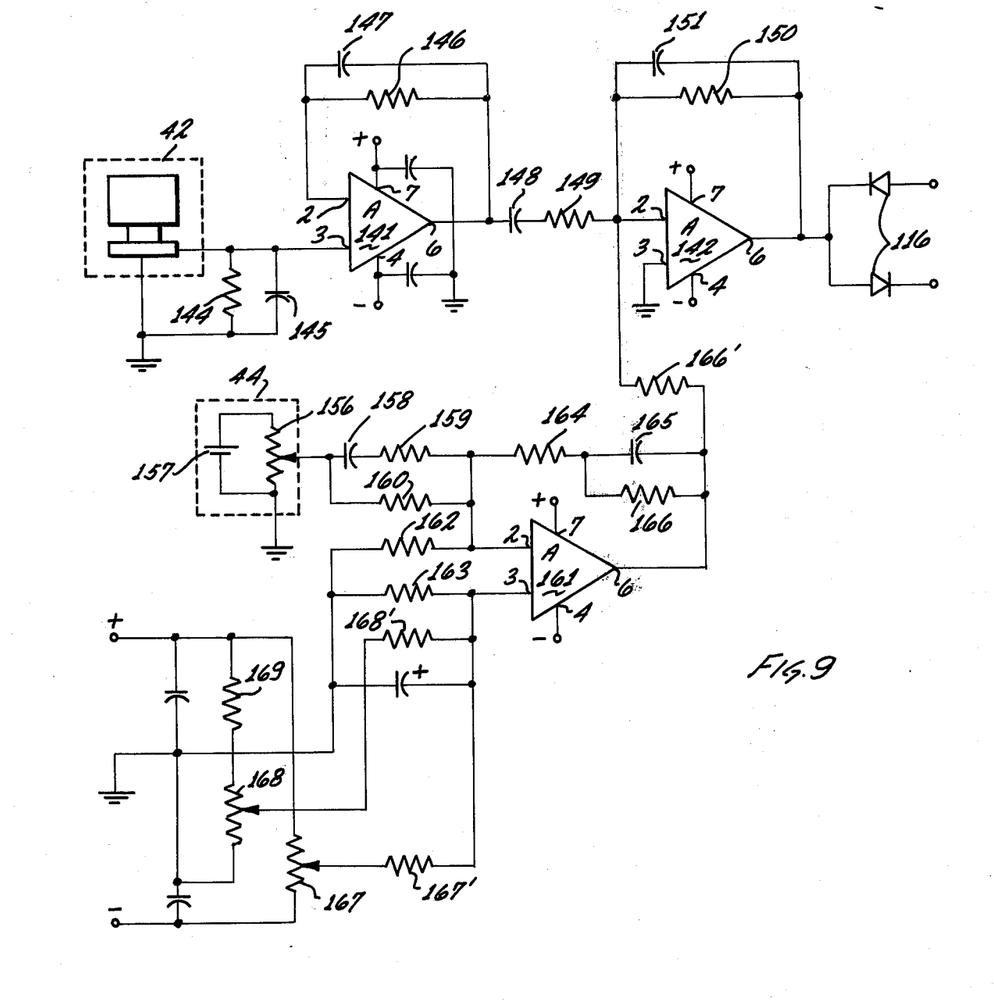
FIG. 9 is a schematic diagram of the electronic feedback control circuit of FIG. 8.

A block diagram of the feedback circuit from U.S. Pat. No. 3,638,093 is shown in FIG. 6. This preferred feedback control circuit comprises two compensating networks 121 and 123, a square rooter 124, a multiplier 125 and a differentiator 126. This circuit, including specific components and operation, is fully described in the aforementioned U.S. Pat. No. 3,638,093. A short summary of this circuit, shown in FIG. 7, is described hereinafter. It is obvious that the circuit of FIG. 8 is a portion of the FIG. 7 circuit, therefore, the values of components and its operation as to this portion are identical.

In the circuit of FIG. 7, amplifier entities 141, 142 and 143 give the details of compensating network 121 of FIG. 6.

Amplifier 141 is a known impedance-matching amplifier and is required to reduce the very high impedance of a piezoelectric accelerometer to an ordinary circuit value. The amplifier may be a Motorola MC 1456G integrated circuit amplifier, or an equivalent operational amplifier. It is connected as a source-follower and has no gain, nor phase shift. The input circuit includes resistor 144, of 250 megohms resistance, connected from amplifier terminal 3 to ground to provide an input bias current path for the amplifier. This is shunted by capacitor 145, of 1,000 picofarads (pf.) capacitance, which acts as a padding capacitor to the stray capacitance of the input lead from the accelerometer to terminal 3. The several terminals of integrated circuits, operational amplifiers, etc., have been given small numerals corresponding to those given by the manufacturer on the device itself. The internal circuits for these devices are known from the manufacturer's catalogs.

Amplifier 141 has a feedback circuit between its terminals 2 and 6 comprised of a 250 megohm resistor 146, shunted by capacitor 147, of 1,000 pf. capacitance. Terminal 7 is connected to a direct current energizing power source having a voltage of the order of +15 volts, while terminal 4 is connected to a similar source with a level of −15 volts. Each of these connections is filtered by a 0.1 picofarad (pf.) capacitor connected therefrom to ground.

Capacitor 148, of 200 pf. capacitance, is connected to the output terminal 6 of amplifier 141 and is present to restrict the low-frequency signal amplitude from the accelerometer with a roll-off starting at 0.13 hertz. This removes the "noise" from the accelerometer circuit at low frequencies. Resistor 149, of 6,800 ohms, is in series with capacitor 148 and with resistor 150, of 0.2 megohms, sets the accelerometer channel gain. Amplifier 142 provides an accelerometer channel gain of 200/6.8 = 30. The second terminal of resistor 149 connects to input terminal 2 of amplifier 142, a Motorola MC 1741CG integrated circuit or equivalent.

There is also another input connection to terminal 2; from the output of the gap-length sensor circuit, to be later described.

Amplifier 142 functions as a simple amplifier, having a feedback circuit connected between input terminal 2 of output terminal 6 comprised of resistor 150, of 0.2 megohm, shunted by capacitor 151, of 1,500 pf. The voltage supply and grounding connections are standard and are known.

The algebraically summed accelerometer and gap sensor signal now pass into terminal 2 of amplifier 143, of the MC 1741G type, through resistor 153, of 30,000 ohms resistance, which is used for gain setting. The same type of feedback circuit is employed for amplifier 143 as was employed for amplifier 142; i.e., resistor 150′ of 0.2 megohm and capacitor 155 of 0.2 pf. Supply circuits are conventional. The output from amplifier 143 is taken from terminal 6 and passes through diode 154, with the cathode thereof connected to the terminal so that only negative signal variations will be passed on. Additionally, diode 152 is connected as a feedback element on amplifier 143 to prevent positive voltage excursions.

Only negative voltages are allowable at the input of the square root circuit 124 which follows because inversion therein to positive signal polarity occurs before the square root function takes place. This prevents taking the square root of negative numbers, which are imaginary. Herein the square root circuit becomes inoperative because feedback of positive polarity drives it to current saturation.

We return now to the second sensor element, position transducer 44 of FIGS. 3, 4 and 5, a device 156, which may take many forms. As shown, it is a linear potentiometer connected to ground and shunted by a source of voltage, as battery 157. The slider is provided with a mechanical roller. This rides on any convenient portion of the unsprung portion, which is parallel with a convenient portion of the sprung portion. The slider is held in contact by a spring (not shown).

Typically, battery 157 may have a voltage of 10 volts and the travel of the slider of the potentiometer having a travel of approximately one-half inch. This range of travel normally covers the operating change in the length of the air gap, the preferred length of which is one-fourth inch or perhaps slightly less. These constants give a voltage of 20 times $l$; i.e., 20 times the length of the air gap as measured in inches. Battery 157 may, alternately, be a regulated power supply of the same voltage.

An alternate displacement sensor 156 may be arranged with a photocell on one side of the ferromagnetic member and electromagnet gap and illumination means on the other. As the gap elongates, more light enters the photocell and a greater electrical response therefrom is obtained, while the reverse is true of the device if the gap narrows.

A further alternate may employ ultrasonic sound, with an electrical response provided by detecting the phase of the sound reflected from the ferromagnetic member.

The output signal 56 from position transducer element 44 passes to compensating network 121 of FIG. 6, which is associated with this transducer. In FIG. 7, capacitor 158, of 0.1 pf, in series with resistor 159, of 4,700 ohms, all shunted by resistor 160, of 1.5 megohms, are the initial elements of compensating network 123. This network has a resistive impedance of 1.5 megohms from d.c. to 1.2 hertz, decreasing to about 4,700 ohms at 350 hertz. This provides a velocity signal (i.e., differentiated displacement) at frequencies above 1.2 hertz.

This output passes to input terminal 2 of operational amplifier 161, an MC 1741G type as before. Both input terminals 2 and 3 of this amplifier are individually returned to ground through resistors 162 and 163, of 22,000 ohms, to provide a path for the input bias currents of this amplifier.

The feedback circuit for amplifier 161 is comprised of resistor 164, 10,000 ohms, in series with capacitor 165, 100 pf; with resistor 166, 100,000 ohms for d.c. and of 10,100 ohms at 14 hertz, approximately. This results in the gain of amplifier 161 at frequencies below 1 hertz being considerably greater than at higher frequencies. This is to increase the loop gain at low frequencies and to provide an integral of displacement function as a feedback signal to gradually correct for changes in load.

Since the purpose of the feedback system is to correct for changes in loading of the vehicle, wind pressure and unevenness of the support surface, the frequency of the feedback signals is very low with respect to the frequencies handled by usual electrical networks. Feedback must be maintained at zero frequency (d.c.). The range of frequencies of maximum interest extends from 0 to 5 hertz for the displacement channel and from 0.3 to 30 hertz for the accelerometer channel.

Potentiometer 167, of 50,000 ohms total resistance, is connected between positive and negative voltage supply sources, each of which may have a voltage of 15 volts with respect to ground. Bypass capacitors, of 59 pf. are provided from each to ground to remove extraneous variations, as known. Potentiometer 167 provides 161. voltage adjustment for any initial effect voltage in amplifier 1161. The slider is connected to input terminal 3 thereof, through isolating resistor 167' of 1.0 megohm.

An additional input to terminal 3 of amplifier 161 is from potentiometer 168, of 2,000 ohms, and passes through attenuating resistor 168', of 1.5 megohms, to provide a reference displacement proportional voltage. Amplifier 161 generates an output voltage proportional to the difference between the voltage reference input to resistor 168' and the input to resistor 160, which is the voltage from displacement transducer 44. Voltage dropping resistor 169, connected in series with potentiometer 168 from the positive voltage connection to ground, typically has a resistance value half as great as the resistance value of potentiometer 168.

The output of amplifier 161, from terminal 6, passes to terminal 2 input of amplifier 142 through resistor 166', of 22,000 ohms, a summing resistor. It is at this point that compensating network 123 joins that of 121, for the inclusion of amplifiers 142 and 143 in common.

The voltage output at amplifier 143 is to be treated to be linearly proportional to a force between the sprung mass and the unsprung mass.

To develop the proper voltage to be applied to the windings of the electromagnet, the force-proportional voltage is to be square rooted and multiplied by the gap length times the coil resistance $+ 0.1 \times 90° \times 2\pi f$.

The first electrical device to significantly execute the mathematics of linearization is the square root circuit identified as 124 in FIG. 6 and as 124' – 170 in FIG. 7. This may be a Motorola integrated circuit MC 1494L, normally known as a "multiplier" of electrical signals fed into it. This is placed in the feedback circuit of an operational amplifier and the square root of the signal input provided is obtained.

The theory and practice of this square root performance is known, being set forth in the (Motorola) manufacturer's, "Specifications and Applications Information," October 1970—DS9163. In FIG. 7 herein the operational amplifier required is identified as 170, and may be an MC 1741G integrated circuit.

In FIG. 7, the output from the previously mentioned diode 154 is connected to gain-setting resistor 171, of 52,000 ohms, and also to ground through resistor 172 of 1,000 ohms. The latter resistor provides a path for any leakage current in diode 154. The input from resistor 171 is connected to terminal 14 of multiplier 124' and also to terminal 2 of amplifier 170. The output of this amplifier, at terminal 6, is connected to terminals 9 and 10 of the multiplier and also to ground by a small capacitor 173 of 10 pf. capacitance, in series with resistor 174 of 510 ohms. Zener diode 175 is also connected between the output of amplifier 170 and ground to prevent accidental latch-up (malfunctioning) of the circuit. A type 1 N–5241 may be used.

The feedback path for amplifier 170 is the multiplier 124' connected between input terminal 2 and output terminal 6 of amplifier 170 and terminals 9–10 and 14 of the multiplier. Capacitor 176, of 10 pf. capacitance, and connected between amplifier terminals 2 and 6 is for the purpose of phase-compensating the amplifier. Input terminal 3 thereof is connected to the slider of potentiometer 177, which potentiometer has a resistance of 20,000 ohms. This provides a voltage reference for the amplifier. This potentiometer is connected in parallel with a duplicate potentiometer 178, which is connected between terminals 2 and 4 of multiplier 125'. Also associated with multiplier 125', resistor 179, 62,000 ohms, is connected between terminals 7 and 8; resistor 180, 30,000 ohms, is connected between terminals 11 and 12; resistor 181, 16,000 ohms, is connected between terminal 1 and ground. A voltage source, typically of 15 volts, of positive polarity is connected to terminal 7 of the amplifier and terminal 15 of the multiplier, whereas a voltage source, typically of 15 volts, of negative polarity is connected to terminals 4 and 5, respectively.

At the input to the whole square root circuit 124 of FIG. 6, a negative signal voltage of 4 volts produces in the whole system a force of 1 g. That is, an equal and opposite force in relation to that of gravity, and so the mass of the sprung portion 10 is magnetically suspended. With the connections and voltages given, the output of the square rooter at terminal 6 of amplifier 170 is the square root of 10 times the input. This is the square root of 10 in effective amount and is taken into consideration in establishing the whole feedback gain. Mathematically, such functioning of the electrical circuits is accounted for in the values of the several $k$ constants.

The output from the square root circuit 124 is connected to the input of multiplier 125 to perform the gap length times the coil resistance, hereinbefore discussed, and also to the input of perfect differentiator 126 to perform the $0.1 \times 90° \times 2\pi f$. In FIG. 7 the input to multiplier 125' is terminal 10 thereon and to the perfect differentiator is capacitor 183 through resistor 190.

The above input to the multiplier may be termed the $x$ input. The $y$ input is connected to input terminal 9 and comes directly from position sensor 44 (156 being one embodiment) through resistor 184 for isolation. The resistance value of resistor 184 may be 0.1 megohm. Both input terminals 9 and 10 are also connected to ground through capacitors 185 and 185', of 10 pf. capacitance, in series with resistors 186 and 186', of 510 ohms resistance, respectively. These prevent high frequency parasitic oscillations.

Resistors 179', 180' and 181' are identical in resistance value and connection to square root unit 124' as these were with respect to unit 125'. So also are potentiometers 177', and 178', except that the resistance value of potentiometer 177' is 50,000 ohms. An additional potentiometer 187', of 20,000 ohms, is connected across terminals 2 and 4 of unit 125', with the slider connected to terminal 6. These three potentiometers are adjusted to give proper $x$, $y$ and output offset bias, as outlined in the manufacturer's "Specification and Application Information" previously referred to.

An MC 1741G operational amplifier 189 coacts with multiplier unit 125' to give the complete multiplier 125 of FIG. 6. Feedback capacitor 176', of 10 pf., is connected to the amplifier at terminals 2 and 6, and is shunted by resistor 188, of 52,000 ohms. Positive and negative voltage supply sources are as before.

Perfect differentiator capacitor 183 has a capacitance of 0.2 pf. It is in a series with resistor 190, of 1,000 ohms resistance. The capacitor connects to input terminal 2 of operational amplifier 191, which may be a MC 1741G type. The feedback circuit of this amplifier is comprised of capacitor 192, 0.0068 pf., and resistor 193, 0.1 megohm, in parallel and connected between amplifier terminals 2 and 6. Second input terminal 3 is grounded. Positive power supply voltage is connected to terminal 7, while the same in negative polarity is connected to terminal 4. This amplifier-differentiator provides the first derivative of the input over a frequency range of from essentially 0 to 200 hertz.

The output from amplifier 191 is taken through summing resistor 194, 62,000 ohms, to input terminal 2 of amplifier 195. The latter mainly raises the signal level, after providing for the summing, for parallel feeding all of the three-phase multipliers that follow.

Similarly, the output from multiplier operational 189 is taken through summing resistor 194', 62,000 ohms, and connects to input terminal 2 of amplifier 195.

The feedback circuit 192', 193' of amplifier 195 is the same as the feedback circuit 192, 193 of amplifier 191; also, input terminal 3 is connected to ground and the power supply connections are the same as before.

The output at terminal 6 of amplifier 195 passes to potentiometer 196, the second terminal of which is connected to ground. The slider of the potentiometer is the output 60 from the feedback circuit of the various figures. This single control feedback output 60 performs the function of maintaining non-contact suspension between the sprung and unsprung portions of the vehicle.

Adjustment of the suspension gap length is accomplished by varying the voltage at the input 3 of amplifier 161, as determined by the setting of potentiometer 168 of FIG. 7.

OPERATION OF THE PREFERRED EMBODIMENT

Referring now to the suspension control block diagram of FIG. 3, when the external power supply to the control circuit, not shown, is energized and the output voltage of the reference supply 68 is 0, the sprung and unsprung portions of the vehicle maintain physical support contact, not shown. To put the system in operation, after the source power is applied, the reference voltage 68 is increased from zero level until a level is reached that provides an output from differential amplifier 66 of sufficient level so that the inputs to coils 26, 28 and 30 of the suspension magnet have the necessary flux to suspend the sprung portion 10 of the vehicle toward the ferromagnetic member 11 and establish a desired gap length therebetween. At the desired gap length the output signal from summing amplifier 64 will be slightly less than the reference voltage level. The amount of voltage difference is that level required to maintain the desired gap length. The output signal level from differential amplifiers 62 and 66 are zero because both of their inputs are equal. The following sequence of events occur when one end of the support magnet 24 has a greater than the desired gap length from the ferromagnetic member 16 and the opposite end maintains substantially the desired length. The control circuit 46 monitoring the end of the support magnet 24 having the increased gap spacing has an increased output signal level while the opposite control circuit output signal level remains substantially constant. This change in output signal level from feedback control 46 results in an increase in the output signal level from summing amplifier 64 and differential amplifier 66. There is a slight increase in signal level at the output of second differential amplifier 66. Accordingly there is an increased output signal level at summing amplifier 72 resulting in increased output from power amplifier 80 and an increased current flow through suspension magnet coil 26. There also is present a slightly increased input signal level to power amplifier 82 and a slightly increased current flow through suspension magnet coil 28. Summing amplifier 78 has an output level slightly less than before resulting in a lower signal input level to power amplifier 84 and a slight drop in current through coil 30 of the support magnet.

Instantaneously, the gap is corrected and the current level through coils 26, 28 and 30 return to an equal condition. It should be obvious that various combinations of gap length differences will be constantly monitored and corrected in this manner.

Referring now to the operation of the block showing of FIG. 4 providing lateral stability to the sprung portion of the vehicle, as seen in this figure, the feedback circuit is comprised of a portion of the circuit shown in FIG. 8. The portions included are the two compensating networks 121' and 123'. Two diodes 116 of the type 1N-914 or equivalent are additionally provided between the common output of the feedback circuit and the power amplifiers 96 and 100. The diodes are positioned so that one passes a positive level signal to its associated power amplifier and the other passes a negative level signal to its associated amplifier.

As hereinbefore mentioned, the coils 102 and 104 of the lateral stability magnet coils are wound in the opposite direction to provide the required strength and direction of rotational pull when co-acting with the coils of support magnet 24 to maintain the sprung portion of the vehicle in a plumb condition regardless of the tilt position of the unsprung portion.

Referring now to the FIG. 5 block showing of the axial stability magnet controls, this circuit has the same sensors and method operation as the showing of FIG. 3. However, the output of the feedback control 50 is fed directly into power amplifiers 106 and 112, one parallel output being inverted by inverter 74" prior to amplification. At the sensors 42" and 44" detect movement of the sprung portion and the change in axial gap length between the sprung portion and the cooperating ferromagnetic members 38 and 40 positioned on the unsprung portions. As the gap length between one of the axial coils and its associated ferromagnetic member increases in length, the coil is supplied with an increase in current to restore the predetermined gap length. As can be seen by the figure, a negative output from the feedback control operates one of the coils and a positive output from the feedback control operates the other coil. When the gap length between both coils and their cooperating ferromagnetic members are equal, neither coil will be energized.

Figure 10:
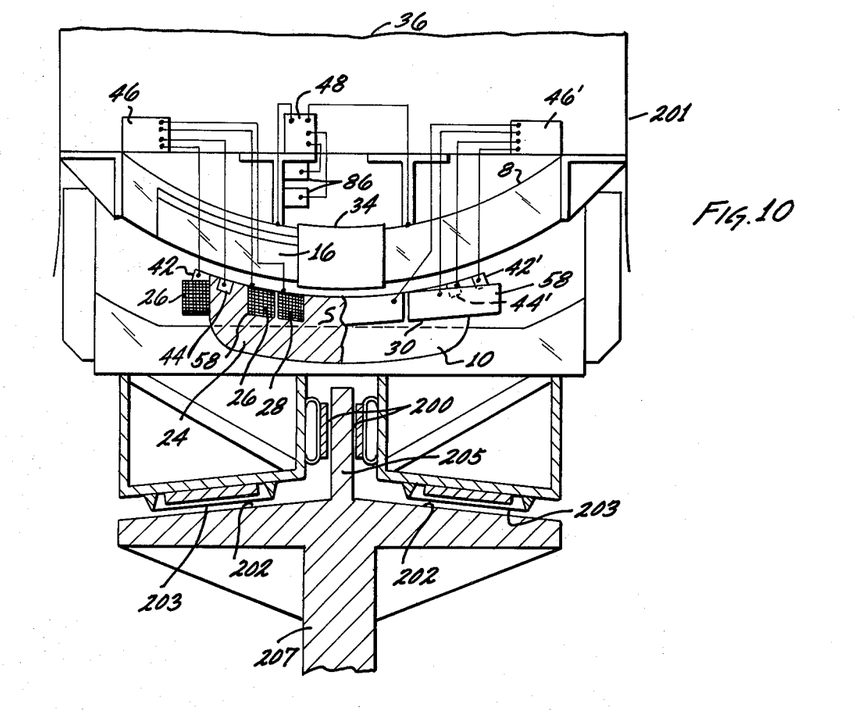
FIG. 10 is a sectional view of a vehicle suspended and guided by an air cushion.

FIG. 10 shows an alternate embodiment wherein the instant invention is utilized on an air cushion high speed vehicle 201. The operation of the support and guidance system is well known and one example is fully described in U.S. Pat. No. 3,330,384, of course the application is not limited by this specific example. A main guideway support 207 includes center upright 205 utilized in combination with high pressure air outlets 200 for guiding the vehicle 201 while the guideway support 207 and upper surface area 202 cooperates with high pressure air outlets 203 for providing vehicle support.

Figure 11:
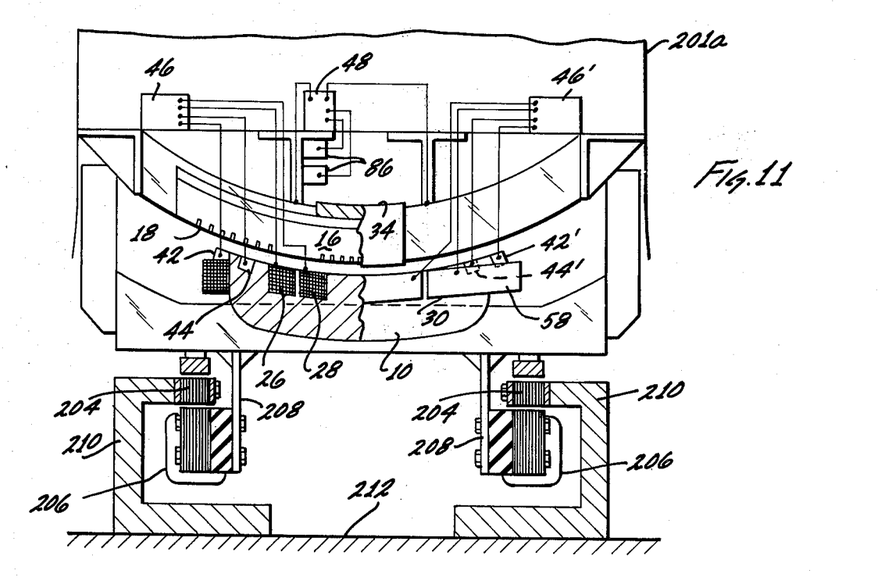
FIG. 11 is a sectional view of a vehicle suspended and guided by magnetic force fields.

FIG. 11 shows a further alternate embodiment wherein the instant invention is utilized on a magnetic supported vehicle 201A. An example of this embodiment is disclosed in U.S. Pat. No. 3,736,880, of course this application is not limited to this specific example. Surface 212 supports rail supports 210 which in turn support ferromagnetic members 204. This vehicle is provided with a pair of support members 208 with electromagnets 206 attached thereto. The control system, not shown, best disclosed in detail in the last mentioned U.S. patent maintains the intensity of the force field of the electromagnets 206 so that the vehicle is attracted upward to a predetermined position with respect to the support surface 212 wherein the force of gravity is overcome and ferromagnetic member 204 and electromagnet 206 establish a spaced apart relationship that remains substantially constant as the vehicle moves along the guideway. It should also be obvious that well known repulsive magnetic systems could also be utilized to practice the invention.

The common portions of the FIGS. 10 and 11 embodiments operate in the same manner as hereinbefore discussed.

This invention may be employed in other specific forms without departing from the spirit or essential characteristics of the present embodiment and is therefore to be considered in all aspects as illustrative and not restrictive. The scope of the invention being indicated by these appended claims rather than by the foregoing description and all changes which come within the meaning and range of equivalency of the claims are therefore intended to be embodied therein.

What is claimed and desired to be secured by United States Letters Patent is:

1. An improved attractive magnetic suspension and vertical dampening apparatus for maintaining the sprung and unsprung portions of a surface supported vehicle in a spaced apart relationship at a predetermined gap length comprising:

an electromagnetic member carried by said sprung portion having a plurality of flux producing windings and at least one concave surface profile;

a ferromagnetic member carried by said unsprung portion having at least one convex surface profile overlaying said electromagnetic member for cooperation therewith; and an active control means carried by said sprung portion responsive to any vertical movement of said sprung portion from an imaginary reference point fixed in free space and any change in the gap length from said predetermined gap length controlling the flux producing current through said windings simultaneously maintaining said predetermined gap length and dampening of vertical movement of said sprung portion.

2. The apparatus of claim 1 wherein said members are positioned transverse to the direction of vehicle travel.

3. The apparatus of claim 2 wherein said windings number three.

4. The apparatus of claim 3 wherein the first and second winding of said windings are placed on the opposite extremities of said electromagnetic member and the third of said windings is positioned equally spaced between said first and second windings at the transverse center of said electromagnetic member.

5. The apparatus of claim 4 wherein said active control means comprises a first and second accelerometer sensor for producing an output signal responsive to the acceleration of vertical movement of said electromagnetic member from said fixed point in free space and a first and second displacement sensor for producing an output signal responsive to changes to said gap length from said predetermined length.

6. The apparatus of claim 5 wherein said first accelerometer and first displacement sensors are positioned on one end of said electromagnetic member and said second accelerometer and second displacement sensors are positioned on the opposite end of said electromagnet remote from said first accelerometer and dispalcement sensors.

maintaining said gap length when said members move from their predetermined position;

a summing amplifier connected to and having a first input from the output of said first non-linear feedback circuit and a second input from the output signal from said second non-linear feedback circuit for producing an output signal equal to the sum of its input signals;

a first differential amplifier connected to and having a first input signal from the output of said first non-linear feedback circuit and a second input signal from the output of said second non-linear feedback circuit for producing an output signal level equal to the difference of its input signals;

a second differential amplifier connected to and having a first input from the output of said summing amplifier and a second input from a reference voltage source producing an output signal level equal to the difference of its input signals;

a third differential amplifier connected to and having a first input from the output of said first differential amplifier and a second input from the output of said second differential amplifier producing an output signal level equal to the difference of its input signals;

a fourth differential amplifier connected to and having a first input connected to the output of said second differential amplifier and a second input from the output of said first differential amplifier through a first inverting amplifier in series therebetween reversing the polarity of said first differential amplifier output signal said fourth differential amplifier producing an output signal level equal to the difference of its input signal levels;

a first high power amplifier connected to and having its input connected to the output of said third differential amplifier and its output connected to said first winding providing an amplified faithful reproduction of its input signal energizing said first winding;

a second high power amplifier connected to and having its input connected to the output of said fourth differential amplifier and its output connected to said second winding providing an amplified faithful reproduction of its input signal energizing said second winding; and a third high power amplifier connected to and having its input connected to the output of said first differential amplifier and its output connected to said third winding providing an amplified faithful reproduction of its input signal and energizing said third winding.

19. The apparatus of claim 12 wherein said plurality lateral stabilizing magnetic coils number two.

20. The apparatus of claim 19 wherein said lateral coils are wound in opposite directions for flux concentration therebetween.

21. The apparatus of claim 20 wherein said second active control means comprises a pendulum accelerometer for producing an output responsive to lateral movement of the sprung portion from a fixed reference point located in free space and a lateral displacement sensor for producing an output signal responsive to the length of relative lateral position change of the sprung and unsprung portions with respect to a predetermined position of each.

22. The apparatus of claim 21 wherein said second active control means additionally comprises:

a third non-linear electrical feedback circuit having input signals from said pendulum accelerometer and said lateral displacement sensor for controlling lateral stability of the sprung portion of said vehicle;

a fourth and fifth high power amplifier each having an input control signal from the output of said third feedback circuit through a separate diode the diodes being oppositely polarized, the outputs of said fourth and fifth amplifiers supplying current to first and second lateral stabilizing magnetic coils respectively.

23. The apparatus of claim 12 wherein said first ferromagnetic member is supported from the vehicle support surface by wheel/axle means.

24. The apparatus of claim 12 wherein said first ferromagnetic member is supported from the vehicle support surface by air cushion means.

25. The apparatus of claim 12 wherein said first ferromagnetic member is supported from the vehicle support surface by magnetic means.

26. The apparatus of claim 25 wherein said magnetic means utilizes attractive magnetic forces.

27. An improved attraction magnetic suspension, vertical dampening and axial stabilizing apparatus for maintaining the sprung and unsprung portions of a surface supported vehicle in a spaced apart relationship at a predetermined gap length comprising:

a first ferromagnetic member carried by said unsprung portion positioned transverse to the direction of vehicle travel;

a suspension electromagnet having a plurality of windings carried by said sprung portion positioned below and opposing said first ferromagnetic member for magnetic attraction therebetween;

a plurality of second ferromagnetic members having a longitudinal spaced apart relationship carried by said unsprung portion positioned transverse to the direction of vehicle travel;

a plurality of axial electromagnets having windings carried by said sprung portion, a spaced apart relationship and positioned juxtaposed to said second plurality of second ferromagnetic members for selective magnetic attraction therebetween;

a first control means carried by said sprung portion constantly varying a current through said plurality of windings in said suspension electromagnet responsive to the acceleration of any vertical movement of said sprung portion from an imaginary reference point in free space and any change in the gap length of said predetermined gap length controlling the flux producing current through said windings simultaneously maintaining said predetermined gap length and dampening of vertical movement of said sprung portion; and a second active control means carried by said sprung portion constantly varying the current through said windings of said plurality of axial electromagnets for maintaining spaced apart axial stability between said sprung and unsprung portions.

28. The apparatus of claim 27 wherein said members are positioned transverse to the direction of vehicle travel.

29. The apparatus of claim 28 wherein said windings number three.

7. The apparatus of claim 1 wherein said ferromagnetic member is supported from the vehicle support surface by wheel/rail means.

8. The apparatus of claim 7 wherein said feedback control means additionally comprises:
- a first and second non-linear electrical feedback circuit each connected to and having input signals from their respective first and second accelerometer and displacement sensor for producing an output signal controlling said vertical dampening and maintaining said gap length when said members move from their predetermined position;
- a summing amplifier connected to and having a first input from the output of said first non-linear feedback circuit and a second input from the output signal from said second non-linear feedback circuit for producing an output signal equal to the sum of its input signals;
- a first differential amplifier connected to and having a first input signal from the output of said first non-linear feedback circuit and a second input signal from the output of said second non-linear feedback circuit for producing an output signal level equal to the difference of its input signals;
- a second differential amplifier connected to and having a first input from the output of said summing amplifier and a second input from a reference voltage source producing an output signal level equal to the difference of its input signals;
- a third differential amplifier connected to and having a first input from the output of said first differential amplifier and a second input from the output of said second differential amplifier producing an output signal level equal to the difference of its input signals;
- a fourth differential amplifier connected to and having a first input connected to the output of said second differential amplifier and a second input from the output of said first differential amplifier through a first inverting amplifier in series therebetween reversing the polarity of said first differential amplifier output signal said fourth differential amplifier producing an output signal level equal to the difference of its input signal levels;
- a first high power amplifier connected to and having its input connected to the output of said third differential amplifier and its output connected to said first winding providing an amplified faithful reproduction of its input signal energizing said first winding;
- a second high power amplifier connected to and having its input connected to the output of said fourth differential amplifier and its output connected to said second winding providing an amplified faithful reproduction of its input signal energizing said second winding; and
- a third high power amplifier connected to and having its input connected to the output of said first differential amplifier and its output connected to said third winding providing an amplified faithful reproduction if its input signal energizing said third winding.

9. The apparatus of claim 1 wherein the ferromagnetic member is supported from the vehicle support surface by air cushion means.

10. The apparatus of claim 1 wherein the ferromagnetic member is supported from the vehicle support surface by magnetic means.

11. The apparatus of claim 9 wherein said magnetic means utilizes attraction magnetic forces.

12. An improved attractive magnetic suspension, vertical dampening and lateral stabilizing apparatus for maintaining comprising: sprung and unsprung portions of a surface supported vehicle in a spaced apart relationship at a predetermined gap length comprising;
- a first ferromagnetic member having a plurality of lateral stabilizing magnetic coils embedded therein carried by said unsprung portion positioned transverse to the direction of travel of said vehicle;
- a suspension electromagnet having a plurality of windings carried by said sprung portion positioned below and opposing said ferromagnetic member for magnetic attraction therebetween;
- a first active control means carried by said sprung portion responsive to any vertical movement of said sprung portion from an imaginary reference point fixed in free space and any change in gap length from said predetermined gap length controlling the flux producing current through said windings simultaneously maintaining said predetermined gap length and dampening of vertical movement of said sprung portion; and
- a second active control means carried by said sprung portion constantly varying the current to said lateral stability magnetic coils, said coils cooperating with said suspension electromagnetic windings for maintaining said sprung portion in a substantially plumb position independent of the position of said unsprung portion.

13. The apparatus of claim 12 wherein said members are positioned transverse to the direction of vehicle travel.

14. The apparatus of claim 13 wherien said windings number three.

15. The apparatus of claim 14 wherein the first and second winding of said windings are placed on the opposite extremities of said electromagnetic member and the third of said windings is positioned equally spaced between said first and second windings at the transverse center of said electromagnetic member.

16. The apparatus of claim 15 wherein said first active control means comprises a first and second accelerometer sensor for producing an output signal responsive to the acceleration of vertical movement of said electromagnetic member from said fixed point in free space and a first and second displacement sensor for producing an output signal responsive to changes to said gap length from said predetermined length.

17. The apparatus of claim 16 wherein said first accelerometer and first displacement sensors are positioned on one end of said electromagnetic member and said second accelerometer and second displacement sensors are positioned on the opposite end of said electromagnet remote from said first accelerometer and displacement sensors.

18. The apparatus of claim 17 wherein said feedback control means additionally comprises:
- a first and second non-linear feedback electrical circuit each connected to and having input signals from their respective first and second accelerometer and displacement sensor for producing an output signal controlling said vertical dampening and 30. The apparatus of claim 29 wherein the first and second winding of said windings are placed on the opposite extremitites of said electromagnetic member and the third of said windings is positioned equally spaced between said first and second windings at the transverse center of said electromagnetic member.

31. The apparatus of claim 30 wherein said active control means comprises a first and second accelerometer sensor for producing an output signal responsive to the acceleration of vertical movement of said electromagnetic member from said fixed point in free space and a first and second displacement sensor for producing an output signal responsive to changes to said gap length from said predetermined length.

32. The apparatus of claim 31 wherein said first accelerometer and first displacement sensors are positioned on one end of said electromagnetic member and said second accelerometer and second displacement sensors are positioned on the opposite end of said electromagnet remote from said first accelerometer and displacement sensors.

33. The apparatus of claim 32 wherein said feedback control means additionally comprises:

a first and second non-linear feedback electrical circuit each connected to and having input signals from their respective first and second accelerometer and displacemenet sensor for producing an output signal controlling said vertical dampening and maintaining said gap length when said members move from their predetermined position;

a summing amplifier connected to and having a first input from the output of said first non-linear feedback circuit and a second input from the output signal from said second non-linear feedback circuit for producing an output signal equal to the sum of its input signals;

a first differential amplifier connected to and having a first input signal from the output of said first non-linear feedback circuit and a second input signal from the output of said second non-linear feedback circuit for producing an output signal level equal to the difference of its input signals;

a second differential amplifier connected to and having a first input from the output of said summing amplifier and a second input from a reference voltage source producing an output signal level equal to the difference of its input signals;

a third differential amplifier connected to and having a first input from the output of said first differential amplifier and a second input from the output of said second differential amplifier producing an output signal level equal to the difference of its input signals;

a fourth differential amplifier connected to and having a first input connected to the output of said second differential amplifier and a second input from the output of siad first differential amplifier through a first inverting amplifier in series therebetween reversing the polarity of said first differential amplifier output signal said fourth differential amplifier producing an output signal level equal to the difference of its input signal levels;

a first high power amplifier connected to and having its input connected to the output of said third differential amplifier and its output connected to said first winding providing an amplified faithful reproduction of its input signal energizing said first winding;

a second high power amplifier connected to and having its input connected to the output of said fourth differential amplifier and its output connected to said second winding providing an amplified faithful reproduction of its input signal energizing said second winding; and a third high power amplifier connected to and having its input connected to the output of said first differential amplifier and its output connected to said third winding providing an amplified faithful reproduction of its input signal energizing said third winding.

34. The apparatus of claim 33 wherein said first ferromagnetic member is supported from the vehicle support surface by wheel/axle means.

35. The apparatus of claim 33 wherein said first ferromagnetic member is supported by air cushion means.

36. The apparatus of claim 33 wherein said first ferromagnetic member is supported by air cushion means.

37. The apparatus of claim 36 wherein said magentic means utilizes attractive magnetic forces.

38. An improved attractive magnetic suspension, vertical dampening, lateral stabilizing and axial stabilizing apparatus for maintaining the sprung and unsprung portions of a surface supported vehicle in a spaced apart relationship at a predetermined gap length comprising:

a first ferromagnetic member having a plurality of lateral stabilizing magnetic coils embedded therein carried by said unsprung portion of and positioned transverse to the direction of travel of said vehicle;

a suspension electromagnet having a plurality of windings carried by said sprung portion positioned below and opposing said first ferromagnetic member for magnetic attraction therebetween;

a plurality of second ferromagnetic members having a longitudinal spaced apart relationship carried by said unsprung portion positioned transverse to the direction of vehicle travel;

a plurality of axial electromagnets having windings carried by said sprung portion having a spaced apart relationship and positioned juxtaposed to said plurality of said second ferromagnetic members for magnetic attraction therebetween;

a first active control means carried by said sprung portion responsive to any vertical movement of said sprung portion from an imaginary reference point fixed in free space and any change in gap length from said predetermined gap length controlling the flux producing current through said windings simultaneously maintaining said predetermined gap length and dampening vertical movement of said sprung portion;

a second active control means carried by said sprung portion constantly varying the current through said windings of said plurality of axial electromagnets for maintaining spaced apart axial stability between said sprung and unsprung portions; and a third active control means carried by said sprung portion constantly varying the current of said lateral stability magnetic coils said coils cooperating with said suspension electromagnet windings for maintaining sprung portions in a substantially plumb position independent of the condition of plumbness of said unsprung portion.

39. The apparatus of claim 38 wherein said first ferromagnetic member is supported from the vehicle support surface by wheel/axle means.

40. The apparatus of claim 38 wherein said first ferromagnetic member is supported from the vehicle support surface by air cushion means.

41. The apparatus of claim 38 wherein said first ferromagnetic member is supported from the vehicle support surface by magnetic means.

42. The apparatus of claim 40 wherein said magnetic means utilizes attractive magnetic forces.

* * * * *